Nov. 9, 1971  M. R. LACEY  3,618,401
ACCELEROMETER
Filed Aug. 25, 1969

INVENTOR.
MICHAEL R. LACEY
BY
Lawrence V. Link Jr.
ATTORNEY

United States Patent Office 3,618,401
Patented Nov. 9, 1971

3,618,401
ACCELEROMETER
Michael R. Lacey, Sherman Oaks, Calif., assignor to Litton Systems, Inc., Beverly Hills, Calif.
Continuation-in-part of application Ser. No. 607,727, Jan. 6, 1967. This application Aug. 25, 1969, Ser. No. 852,694
Int. Cl. G01p 15/02
U.S. Cl. 73—517
6 Claims

ABSTRACT OF THE DISCLOSURE

A pendulous accelerometer sensing mass which is elastically constrained against translation in an X-Y plane and rotationally constrained in the X-Y plane by a servo mechanism, adapted to sense acceleration in the X direction, in which the anisoelastic torques and the cross coupling or vibropendulous rectification torques, in the presence of an acceleration in the X-Y plane at an angle to the X axis, compensate each other.

CROSS REFERENCE TO RELATED APPLICATION

This application is a continuation-in-part of U.S. patent application Ser. No. 607,727 filed Jan. 6, 1967, now abandoned.

SHORT DESCRIPTION OF THE INVENTION

For a simple mass $m$ constrained in the X-Y plane by elastic devices having spring compliances in the X and Y directions of $C_x$ and $C_y$, respectively, and acted upon by a linear acceleration $a$ in the X-Y plane, at an angle $\theta$ with the X axis, the torque $T_{ZA}$ about the Z axis perpendicular at the X-Y plane is defined as the anisoelastic torque, $$T_{ZA} = \frac{a^2 m^2}{2}(C_x - C_y) \sin \theta$$

For a simple pendulum having a mass $m$ and a length $l$, between the center of rotation and the center of mass, partly constrained in rotation in the X-Y plane by a torque rebalancing servo mechanism of gain $k$ and acted upon by an acceleration $a$ at an angle $\theta$, relative to the X axis, in the X-Y plane, the torque $T_{ZV}$ due to cross-coupling or vibropendulous rectification is defined as, $$T_{ZV} = \frac{a^2 m^2}{2k} l^2 \sin 2\theta$$

In order to have the anisoelastic torque cancel the torque due to vibropendulous rectification, in accordance with this invention, set $T_{ZA} + T_{ZV} = 0$ and solve for $k$, $k$ must be equal to $$l^2/(C_z - C_x)$$

It is therefore an object of this invention to reduce errors in an accelerometer due to anisoelastic torque.

It is another object of this invention, in an accelerometer, to reduce errors caused by torque due to cross-coupling or vibropendulous rectification.

It is a more specific object of this invention to adjust the gain of a rebalancing servo mechanism to cause the vibropendulous rectification torque to be equal in amplitude to the anisoelastic torque; the sign of these two last mentioned torques will be opposite for $C_y > C_x$.

It is still a more specific object of this invention to provide an accelerometer in which the gain of a rebalancing servo mechanism is adjusted to cause the vibropendulous rectification torque to be equal in amplitude and opposite in sign to the anisoelastic torque.

Other objects will become apparent from the following description, taken in connection with the accompanying drawings in which.

DETAILED DESCRIPTION OF THE INVENTION

The device of this invention is of the kind—for example—generally described in patent application Ser. No. 578,172, filed Sept. 9, 1966 by Robert E. Stewart for "Accelerometer."

Figure 1:
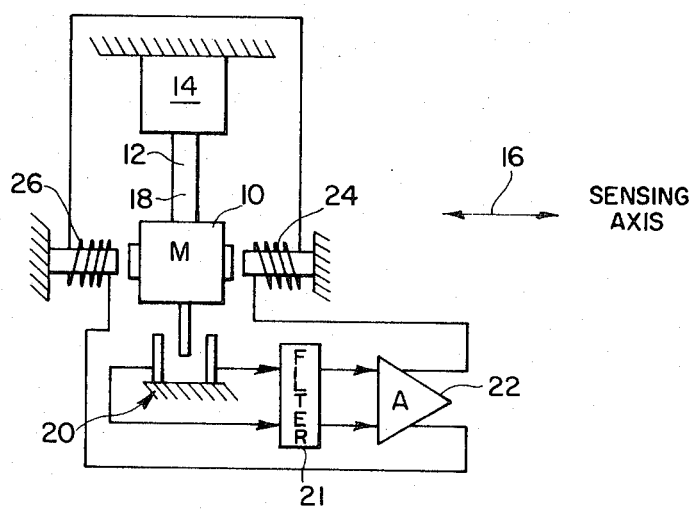
FIG. 1 is a rudimentary drawing of a pendulous accelerometer.

A simplified diagram of a typical accelerometer of the class described is shown in FIG. 1. In the device of FIG. 1, an acceleration sensing mass 10 is adapted to be rotated slightly about the axis of rotation 12 when acceleration is applied to the supporting structure 14, as shown by the arrows 16. The sensing mass is supported—for example—by a leaf-spring 18. The leaf-spring 18 is not—in general—isoelastic, i.e. it has a different spring compliance ($C_x$) in the direction of the arrows 16 than the spring compliance ($C_y$) in a direction perpendicular to the arrow 16. The different spring constants are shown schematically in FIG. 2. In the configuration shown, by design, $C_y$ will be larger (more compliant) than $C_x$.

A means 20, for sensing rotational displacement—for example, a capacitive pickoff—is connected through a servo mechanism comprising a filter network 21, an amplifier 22 and forcing coils 24, 26 to maintain the mass 10 substantially in its rotationally centered position in the presence of acceleration. In typical operation, the base 14 is accelerated and the mass 10 tends to rotate with respect to (lag behind) the base 14, whereby a signal is sensed by pickoff 20. The signal is amplified by servo amplifier 22 to apply a magnetic field to mass 10 by means of magnetic coils 24 and 26 to hold the mass 10 in its rotationally fixed position relative to the supporting craft 14. The filter 21 attenuates the signal transmitted therethrough in accordance with a selected relationship which may be a function of the frequency of the signal, as will be explained further hereinafter.

When accelerations are applied to the device of FIG. 1, in a direction other than along a principal axis 16, anisoelastic torques are developed due to the fact that $C_y$ does not equal $C_x$. The anisoelastic torques appear as errors in the reading of the component of acceleration in the direction of sensing axis 16.

Further, ordinarily torques are generated on mass 10 about the center 12 because of vibropendulous rectification or cross-coupling. The mass 10 rotates slightly from its centered position in order to generate a signal in a pickoff 20. When the mass 10 is slightly rotated cross-coupling errors occur, the torque of which is designated cross-coupling or vibropendulous rectification torque.

A description of anisoelastic torque errors may be found on pages 77 through 79 of "Analysis and Design of the Gyroscope for Inertial Guidance" by Ira Cochin, published by 1963 by John Wiley and Sons Inc.

Figure 2:
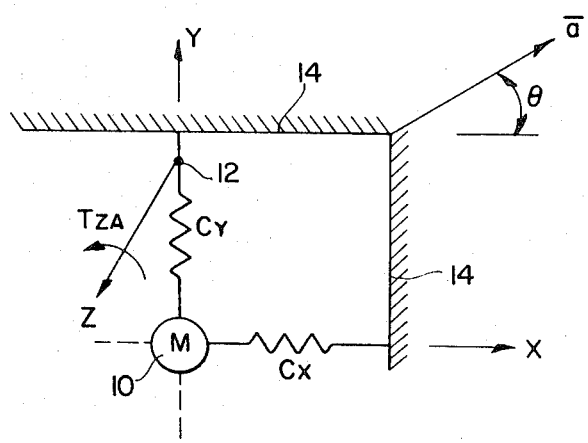
FIG. 2 is a schematic drawing adapted to explain anisoelastic torque.

Referring to FIG. 2, there is shown a mass 10 supported relative to the supporting vehicle 14 by what appears to be a pair of springs, but are really only a schematic representation of the spring constants in the X and Y directions of the X-Y plane. An acceleration $a$ is shown applied in the X-Y plane. A Z axis is shown perpendicular to the X-Y plane and forming a right-handed system of coordinates. The spring compliances $C_x$ and $C_y$ are expressed in units of displacement per unit of force, e.g. inches per pound. Hence, the deflection of the mass 10 in the direction of the X axis may be shown by:

$$C_x F_x = -\delta_x \tag{1}$$

wherein $F_x$ is the restoring force in the X direction, $\delta_x$ is the deflection of the mass 10 in the X direction, and $C_x$ is the compliance in the X direction. Similarly, $$C_y F_y = -\delta_y \tag{2}$$

wherein $F_y$ is the component of force in the Y direction. $\delta_y$ is the deflection of mass 10 in the Y direction and $C_y$ is the compliance in the Y direction. Thus, for static equilibrium $$F_x = ma \cos \theta \tag{3}$$

$$F_y = ma \sin \theta \tag{4}$$

The torque applied to mass 10 about the Z axis is designated ($T_{ZA}$) in the following torque equilibrium equation:

$$T_{ZA} + F_y \delta_x - F_x \delta_y = 0 \tag{5}$$

substituting Equations 1 and 2 into Equation 5, $$T_{ZA} = C_x F_x F_y - C_y F_x F_y = (C_x - C_y) F_x F_y \tag{6}$$

substituting Equations 3 and 4 into Equation 6, $$T_{ZA} = (C_x - C_y) m^2 a^2 \sin \theta \cos \theta \tag{7}$$

which is equal to:

$$T_{ZA} = \frac{(C_x - C_y)}{Z} m^2 a^2 \sin 2\theta \tag{8}$$

Figure 3:
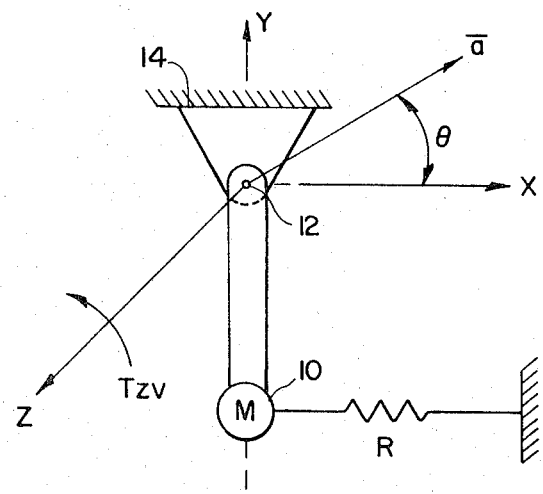
FIG. 3 is a schematic drawing adapted to explain torque caused by cross-coupling or vibropendulous rectification.

To determine the torque due to cross-coupling or vibropendulous rectification, it is convenient to refer to FIG. 3. In FIG. 3, the distance between the center of mass of mass 10 and the center of twist 12 is designated $l$. The spring, showing a torsion spring constant $k$, represents the tendency of filter 21, amplifier 22 and forcing coil 24, 26 to hold the mass 10 in a rotationally central position. Obviously, mass 10 must rotate slightly or there would not be a signal at the output of amplifier 22. It is the essence of this invention that by adjusting the gain of the servo loop, the spring constant $k$ may be chosen as a predetermined function of the distance $l$ and the difference between the spring constants $C_x$ and $C_y$ to cause the vibropendulous rectification torque to exactly equal and counteract the anisoelastic torque.

A description of vibropendulous error may be found between pages 500 and 504 of "Inertial Guidance Engineering" by Fernandez and Macomber published in 1962 by Prentice Hall.

In the presence of the shown acceleration, the mass 10 rotates slightly clockwise (see FIG. 3). The rotation is sensed by pick-off 20 to cause the forcing coils 24, 26 to hold the rotational hang-off angle $\beta$ to substantially zero.

The force in the X direction, due to the applied acceleration $a$, is $$F_x = ma \cos \theta \tag{9}$$

The force in the Y direction, due to the acceleration $a$, is $$F_y = ma \sin \theta \tag{10}$$

The hang-off angle $\beta$ is substantially equal to the torque, caused by the X component of force, divided by the torsion spring constant $k$, i.e. substantially equal to:

$$\beta = \frac{lma \cos \theta}{k} \tag{11}$$

Based upon the assumption that sine $\beta$ is equal to $\beta$ for small angles of $\beta$, the distance $\Delta$ of hang-off to the left of the mass 10, is equal to the length of the pendulum $l$ times the angle of hang-off $\beta$.

$$\Delta = l \sin \beta = l\beta \tag{12}$$

Substituting Equation 11 into Equation 12:

$$\Delta = \frac{l^2 ma \cos \theta}{k} \tag{13}$$

Using the convention that counter-clockwise torques are positive, the cross-coupling or vibropendulous torque is, for the illustrated example, counter-clockwise (and hence positive) and equal to:

$$T_{ZV} - F_y \Delta = 0 \tag{14}$$

Substituting Equations 10 and 13 into Equation 14:

$$T_{ZV} = \frac{l^2 m^2 a^2 \cos \theta \sin \theta}{k} \tag{15}$$

which reduces to:

$$T_{ZV} = \frac{l^2 m^2 a^2 \sin 2\theta}{2k} \tag{16}$$

Setting $T_{ZA}$ equal to $-T_{ZV}$, and solving for $k$, $$k = \frac{-l^2}{(C_x - C_y)} \tag{17}$$

which may be physically realized by adjusting the gain of amplifier 22.

The units of $k$ are units of torque per radium of displacement.

Many of the parameters associated with the accelerometer are functions of frequency, and the gain through the combination of the filter 21 and the amplifier 22 may be selected to vary with frequency in such a manner as to cause the vibropendulous rectification torque to be equal in magnitude and opposite in polarity from the anisoelastic torque over a relatively broad frequency spectrum—particularly below the resonant frequency of the system. The approximate required gain-frequency response for the combination of filter 21 and amplifier 22 may be determined empirically for each different model of accelerometer with fine adjustments made during final calibration of each instrument.

Although the invention has been described in detail above, it is not intended that the invention should be limited by that description, but only in accordance with the spirit and scope of the appended claims.

I claim:
1. An accelerometer comprising:
   a sensing mass;
   means for pendulously mounting said sensing mass;
   means for sensing the angular displacement of said sensing mass from a null position; and
   a servo mechanism responding to said sensing means for maintaining said mass substantially at the null position, said servo mechanism having a predetermined gain value for causing anisoelastically induced torques and cross-coupling torques acting upon said sensing mass to be substantially equal in magnitude and opposite in direction whereby the last mentioned two torques are substantially canceled.
2. The device of claim 1 wherein said mounting means includes means for elastically constraining said sensing mass against translation in a plane so that the spring compliance of said constraining means in the direction of the sensing axis is different from the spring compliance perpendicular to said sensing axis.
3. The device of claim 2 wherein the spring compliance of said constraining means in the direction of the sensing axis is less than the spring compliance perpendicular to said sensing axis.
4. The device of claim 2 wherein said means for constraining said sensing mass includes a pendulum arm and the gain value of said servo mechanism is a function of the square of the effective length of the pendulum arm divided by, the difference between the spring compliance in the direction perpendicular to the sensing axis and the spring compliance in the direction of the accelerometer sensing axis.

5. The device of claim 3 wherein said means for constraining said sensing mass includes a pendulum arm and the gain value of said servo mechanism is a function of the square of the effective length of the pendulum arm divided by, the difference between the spring compliance in the direction perpendicular to the sensing axis and the spring compliance in the direction of the accelerometer sensing axis.

6. The device of claim 5 wherein said pendulum arm includes a leaf-spring.

References Cited

UNITED STATES PATENTS

| | | | |
|---|---|---|---|
| 2,968,949 | 1/1961 | Lassen | 73—504 |
| 3,111,850 | 11/1963 | Anderson | 73—517 |
| 3,237,456 | 3/1966 | Shaw Jr. | 73—517 |
| 3,339,419 | 9/1967 | Wilcox | 73—517 |

JAMES T. GILL, Primary Examiner

H. GOLDSTEIN, Assistant Examiner